(12) United States Patent
Levine et al.

(10) Patent No.: US 6,947,534 B2
(45) Date of Patent: Sep. 20, 2005

(54) TELEPHONE INTERCOM METHODS AND SYSTEMS

(75) Inventors: David A. Levine, Atlanta, GA (US); Hong Nguyen, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 326 days.

(21) Appl. No.: 09/964,384

(22) Filed: Sep. 28, 2001

(65) Prior Publication Data

US 2005/0117728 A1    Jun. 2, 2005

(51) Int. Cl.⁷ .............................................. H04M 1/60
(52) U.S. Cl. ............. 379/167.01; 379/159; 379/167.11
(58) Field of Search ...................... 379/167.01, 167.04, 379/167.11, 171, 172, 373.07, 156, 159, 201–202, 379/201.12, 202.01, 203.01, 204.01

(56) References Cited

U.S. PATENT DOCUMENTS

| | | | |
|---|---|---|---|
| 4,769,837 A | * | 9/1988 | McCormick et al. ....... 379/393 |
| 4,926,470 A | | 5/1990 | Sanford |
| 5,040,209 A | | 8/1991 | Greenberg et al. |
| 5,247,571 A | * | 9/1993 | Kay et al. .............. 379/221.09 |
| 5,422,941 A | | 6/1995 | Hasenauer et al. |
| 5,930,346 A | * | 7/1999 | Chen ...................... 379/211.02 |
| 5,953,400 A | | 9/1999 | Rosenthal et al. |
| 5,974,133 A | * | 10/1999 | Fleischer, III et al. ...... 379/230 |
| 6,175,574 B1 | * | 1/2001 | Lewis ......................... 370/522 |
| 6,345,047 B1 | * | 2/2002 | Regnier ...................... 370/352 |

FOREIGN PATENT DOCUMENTS

WO    PCT/US02/30745    9/2002

* cited by examiner

Primary Examiner—Curtis Kuntz
Assistant Examiner—Barry Taylor
(74) Attorney, Agent, or Firm—Withers & Keys, LLC (57) ABSTRACT

Embodiments of the present invention relate to systems and methods for providing an intercom service. In an embodiment of the present invention, an intercom service request is received. The intercom service request includes a calling number associated with a location. The calling number is determined to correspond to a subscriber to the intercom service. Initiation of an intercom call to the location is directed.

65 Claims, 6 Drawing Sheets

TELEPHONE INTERCOM METHODS AND SYSTEMS

BACKGROUND OF THE INVENTION

1. Field of the Invention

Embodiments of the present invention relate to residence intercom systems. More particularly, embodiments of the present invention relate to systems and methods for using the telephones associated with a telephone number as an intercom system.

2. Background Information

Known systems for providing intercom services within a residence typically require purchasing and installing wireless and/or wired intercom transceivers. For example, a wireless intercom system can include a pair of wireless transceivers, each of which typically have a push-to-talk button. When the push-to-talk button on one transceiver is pressed by a first person, the other transceiver typically emits a signal (e.g., tone, buzz, alarm) to alert another person that an intercom message will follow. When the first person begins talking into the transceiver, his or her voice is transmitted to the other transceiver so that the other person can hear the first person. A disadvantage of such intercom systems is that they typically must be purchased and installed, which can involve a not insubstantial cost and effort.

Another known method of providing quasi-intercom services within a residence utilizes both telephone lines of a residence having two phone lines for telephone service. A first person can use one telephone line to call the other telephone line of the residence. When the other person answers the call, a quasi-intercom communication session is established. Using both telephone lines of a residence as a quasi-intercom system typically is not practical. For example, the second telephone line is typically used to provide a dedicated fax line or Internet connection and is typically located in a single room. Accordingly, the second telephone line is typically not available to receive a voice telephone call. As another example, a second telephone line is often for use by a particular person—e.g., a dedicated phone in a teenager's bedroom for a teenager that spends a lot of time on the telephone—and not generally available throughout the residence. Moreover, to use both telephone lines of a residence as a quasi-intercom service system typically requires that each telephone in the residence be a two-line telephone instead of a typical single-line telephone. In view of the foregoing, it can be appreciated that a substantial need exists for systems and methods that can advantageously provide for intercom services in a residence.

SUMMARY OF THE INVENTION

Embodiments of the present invention relate to systems and methods for providing an intercom service. In an embodiment of the present invention, an intercom service request is received. The intercom service request includes a calling number associated with a location. The calling number is determined to correspond to a subscriber to the intercom service. Initiation of an intercom call to the location is directed.

DETAILED DESCRIPTION OF THE INVENTION

According to an embodiment of the present invention, single-line telephones in a residence can be used as part of a residential intercom system. In another embodiment, one line or the other line of two-line telephones can be used a part of a residential intercom system. A first user can take a telephone off-hook at a residence (e.g., a location associated with at least one phone number) and dial an intercom service request number such as, for example, a telephone number, a public feature code (e.g., *xx), and so on. The user can then hang up the telephone, and a call will be received at the residence causing the telephones at the residence to ring. In an embodiment, the user hangs up after hearing a confirmation announcement so that the SCP can receive the query before the user hangs up. The user can refrain from answering the call so that another person in the residence will take another telephone off-hook. The user can then pick up the telephone and establish an intercom communication session with the other person in the residence via the telephones of the residence.

Figure 1:
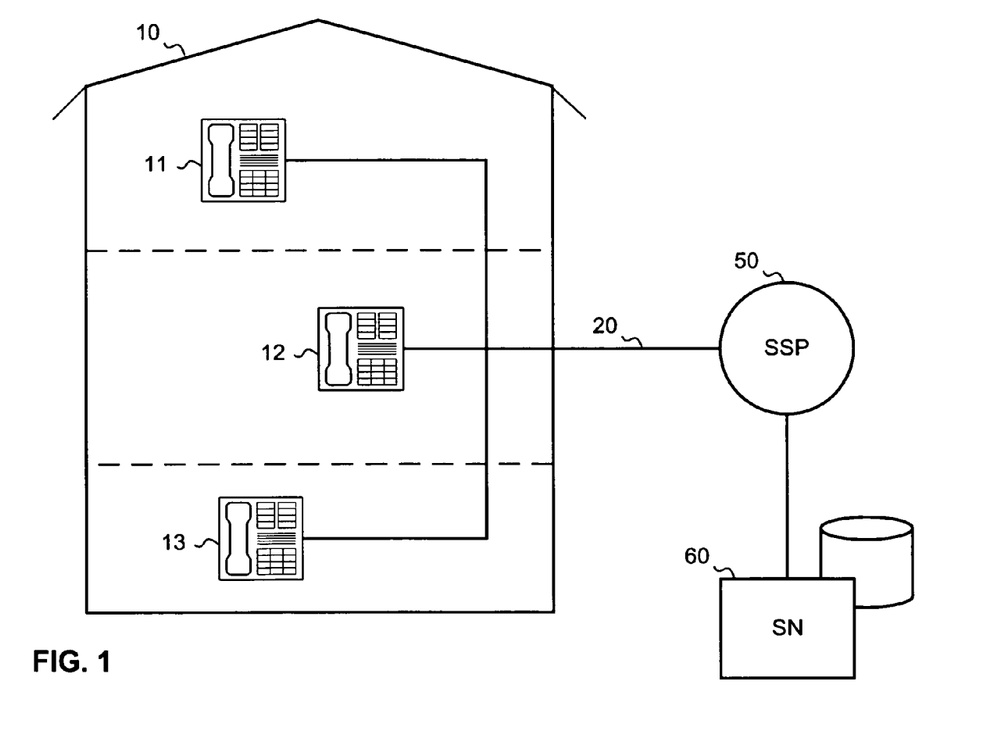
FIG. 1 is a schematic diagram of an embodiment of the present invention.

FIG. 1 is a schematic diagram of an embodiment of the present invention. A residence 10 can include a plurality of telephones 11, 12, and 13. Residence 10 can be, for example, a house, an apartment, a business location, a physical location associated with at least one telephone number, and so on. Each of telephones 11, 12, and 13 can be associated with at least one phone number. For example, each of telephone 11, 12, and 13 can be single-line telephone associated with the telephone number of residence 10.

As shown in FIG. 1, telephones 11, 12, and 13 can be coupled to a service node ("SN") 60 via a service switching point ("SSP") 50 and a communications link 20. As used to describe embodiments of the present invention, the term "coupled" encompasses a direct connection, an indirect connection, or a combination thereof. Moreover, two devices that are coupled can engage in direct communications, in indirect communications, or a combination thereof.

Communications link 20 can be a landline telephone connection to a central office of the PSTN (public switched telephone network), a wireless communications link, a data communications link, a network connection, and so on. In an embodiment, telephones 11–13 are coupled to SSP 50 via a network connection. Examples of a network include a Wide Area Network (WAN), a Local Area Network (LAN), the Internet, a wireless network, a wired network, a connection-oriented network, a packet network, an Internet Protocol (IP) network, or a combination thereof.

In an embodiment of the present invention, a first user at telephone 11 takes the telephone 11 off-hook and initiates a call (e.g., an intercom service request call) by dialing a telephone number that is associated with the intercom service (e.g., 404-555-INTC) on a key pad of telephone 11. A telephone number is an example of a key sequence that can be dialed on a keypad of a telephone number. Another example of a key sequence that can be dialed on a telephone is a public feature code (e.g., *XX).

The dialed telephone number can be associated with service node 60. Service node 60 answers the call, records the calling number of telephone 11, and terminates the call. The service node 60 may or may not answer the call because it gets the calling number shortly after the caller dials the last digit of the dialed number. In an embodiment, the service node 60 can play an announcement (e.g., "You have reached the intercom service. Please hang up your phone and an intercom call will be placed to your number shortly. Thank you.") after answering the call.

The service node 60 can check a service database to see if the calling number is subscribed to the intercom service. If the calling number is not subscribed to the intercom service, the calling number can be charged a per-use service fee (e.g., as with directory assistance or public feature code services) or denied service. When the calling number is subscribed to the intercom service or charged a per-use service fee, the service node 60 can place a call (e.g., an intercom service call) to the calling number associated with telephones 11, 12, and 13.

The first user that initiated the intercom service request call from telephone 11 can refrain from answering the intercom service call from service node 60 so that another person (e.g., a second user) in residence 10—e.g., the person the first user wanted to reach via the intercom service—can hear the ringing of telephones 11, 12, and 13 and answer the intercom service call. After the second user answers the intercom service call by taking, for example, one of telephones 12 and 13 off hook, the first user can take telephone 11 off-hook and begin speaking to the second user. For example, after the second user answers the intercom service call, the telephone ringing ceases (indicating that the second user has answered the call) and the first user can take telephone 11 off-hook and begin speaking to the second user. During the intercom service call, the line is not interrupted by a busy signal, dial tone, or unwanted messages so that the first user and second user can engage in communications.

In another embodiment, residence 10 can have two or more telephone numbers (e.g., a first telephone number on a first telephone line and a second telephone number on a second telephone line) and each of telephones 11, 12, and 13 can be associated with at least one of the two or more telephone numbers/lines. When at least two of telephones 11, 12, and 13 are associated with one of the two telephone numbers/lines, that telephone line can be used as part of the telephone intercom service. For example, a first user can use the telephone number/line to request an intercom service call, and the intercom service call can be made to that telephone number/line so that each of the first user and a second user can engage in intercom communications over that telephone number/line.

In an embodiment, when the service node 60 detects that one of telephones 11, 12, and 13 has gone off-hook, the service node 60 can play an announcement indicating that the call is an intercom service call (e.g., "This is an intercom call. Please stay on the line until another party at your location joins the intercom call."). The service node 60 can maintain the intercom call until one or more of a terminating condition occurs. For example, a terminating condition can be that no phone at residence 10 associated with the called number is off-hook (e.g., the last party to the intercom call has hung up the telephone). In an embodiment, the service node 60 maintains the call and requires service node system resources. Accordingly, an intercom call can have a predetermined maximum length and terminates after a predetermined period of time (e.g., after two minutes, after four minutes) if not terminated earlier.

In an embodiment, after an intercom service call has exceeded a predetermined amount of time, the service node 60 can notify the parties to the intercom service call (e.g., the first user and the second user) that the intercom service call will be terminated (e.g., in 30 seconds, in one minute), an additional fee will be imposed for continued use (e.g., a fee for an additional period of time, a fee for an unlimited continued use), or the intercom service call can be continued by selecting an option (e.g., "Press 1 to purchase an additional minutes for $0.10 per minute; press 2 to subscribe to the intercom service with unlimited intercom calls for $5.00 per month; and press 3 for more options"). In another embodiment, the service node 60 terminates the intercom call after a predetermined period without notice to the parties to the intercom call.

According to an embodiment of the present invention, when the service node 60 places a call (e.g., an intercom service call) to the calling number associated with telephones 11, 12, and 13 after receiving an intercom service request call, the service node 60 causes a distinctive ring signal to be sent to telephones 11, 12, and 13 with the intercom service call so that potential parties to the intercom call at residence 10 can recognize that a person at residence 10 is attempting to establish an intercom call. For example, the first user may have made the intercom service request call via telephone 11. When the second user hears the distinctive ringing of one or more of telephones 12 and 13, he or she will recognize the call as an intercom service call.

In an embodiment in which an intercom service call is delivered with a distinctive ring, intercom service calls can use a second phone number (e.g., a subscriber intercom service telephone number) associated with residence 10 instead of the main number of residence 10 (e.g., the calling number). An example of a service that provides a distinctive ring for a second phone number associated with a residence is the BellSouth RingMaster® service. With the RingMaster service, calls to the main number of the residence have the typical one long ring type of telephone ringing (e.g., a six second long ring cycle having two seconds of ringing followed by four of silence). The residence can also have at least one RingMaster telephone number that is different from the main number of the residence. Calls to the RingMaster telephone number can have telephone ringing characterized by two short rings per ring cycle instead of one long ring per ring cycle. Additional RingMaster telephone numbers for the residence can have different telephone ringing. For example, calls to a second RingMaster number associated with the residence (e.g., a telephone number different from the main number and a first RingMaster number associated with the residence) can have telephone ringing characterized by a short-long-short ring per ringing cycle. In an embodiment, after a user makes an intercom service call request, the service node 60 can check a service database to see if the calling number is subscribed to the intercom service and if the intercom service call is to be made to a telephone number different from the calling number, e.g., to a telephone number having a distinctive ring.

In an embodiment of the present invention, intercom service calls (e.g., from the service node) can have a descriptive CallerID name that indicates the call is an intercom service call. In another embodiment of the present invention, intercom services calls can have both a descriptive CallerID name as well as a distinctive ring.

Figure 2:
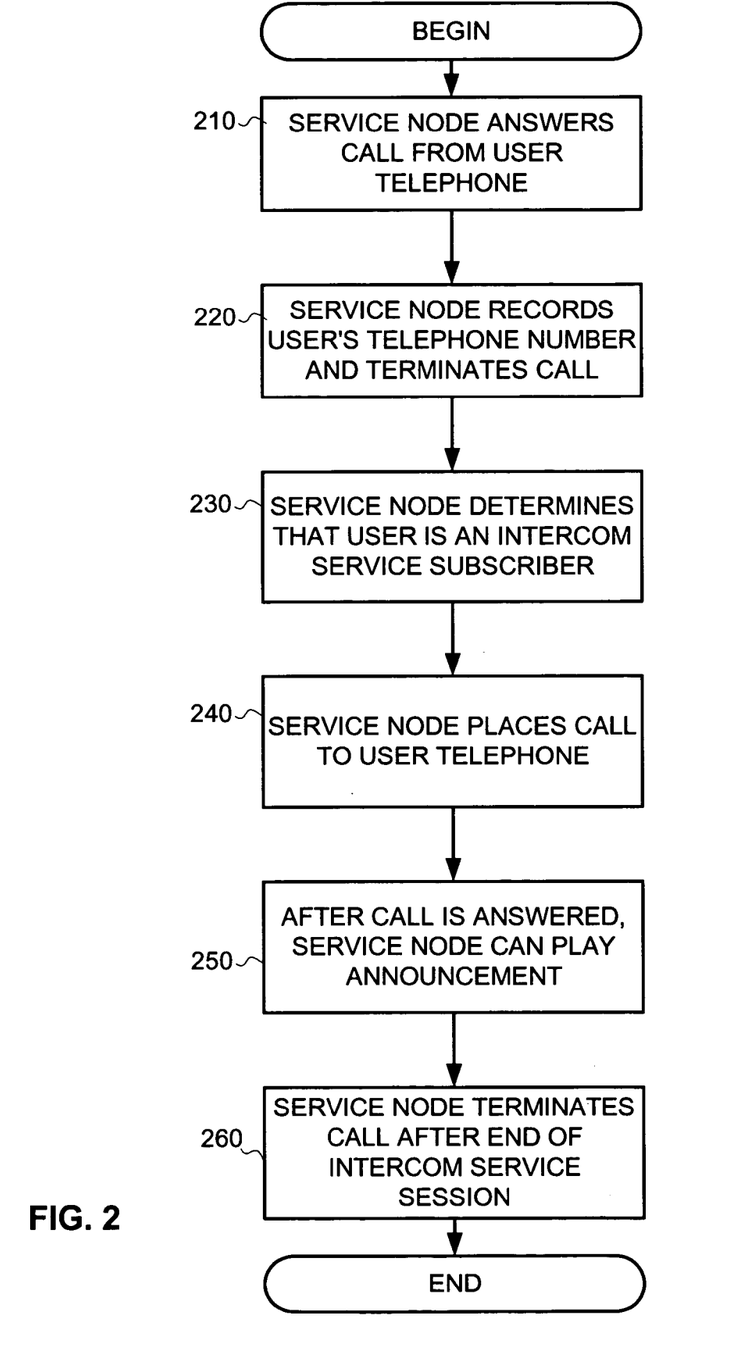
FIG. 2 illustrates operations in accordance with an embodiment of the present invention.

FIG. 2 illustrates operations in accordance with an embodiment of the present invention. A service node answers a call from a telephone of a user (step 210). The service node records the user's telephone number (e.g., the calling number) and terminates the call (step 220). In an embodiment, the service node can play an announcement to the user (e.g., "To request an Intercom Call, please hang up your telephone.") The service node determines that the user is an intercom service subscriber (step 230) and places a call to the user telephone (step 240). The call to the user telephone can be a call to the user's telephone number (e.g., the calling number) with a normal ring, a call to the user's telephone number with a distinctive ring, a call to a second number associated with the user having a distinctive ring, and so on. After the call is answered, the service node can play an announcement indicating that the call is an intercom call (step 250). After the end of the intercom service session, the service node terminates the call (step 260). The intercom service session can end after a predetermined period of time, after the last user telephone hangs up, after the user has responded to options regarding continuation and/or termination of the intercom call, and so on.

Figure 3:
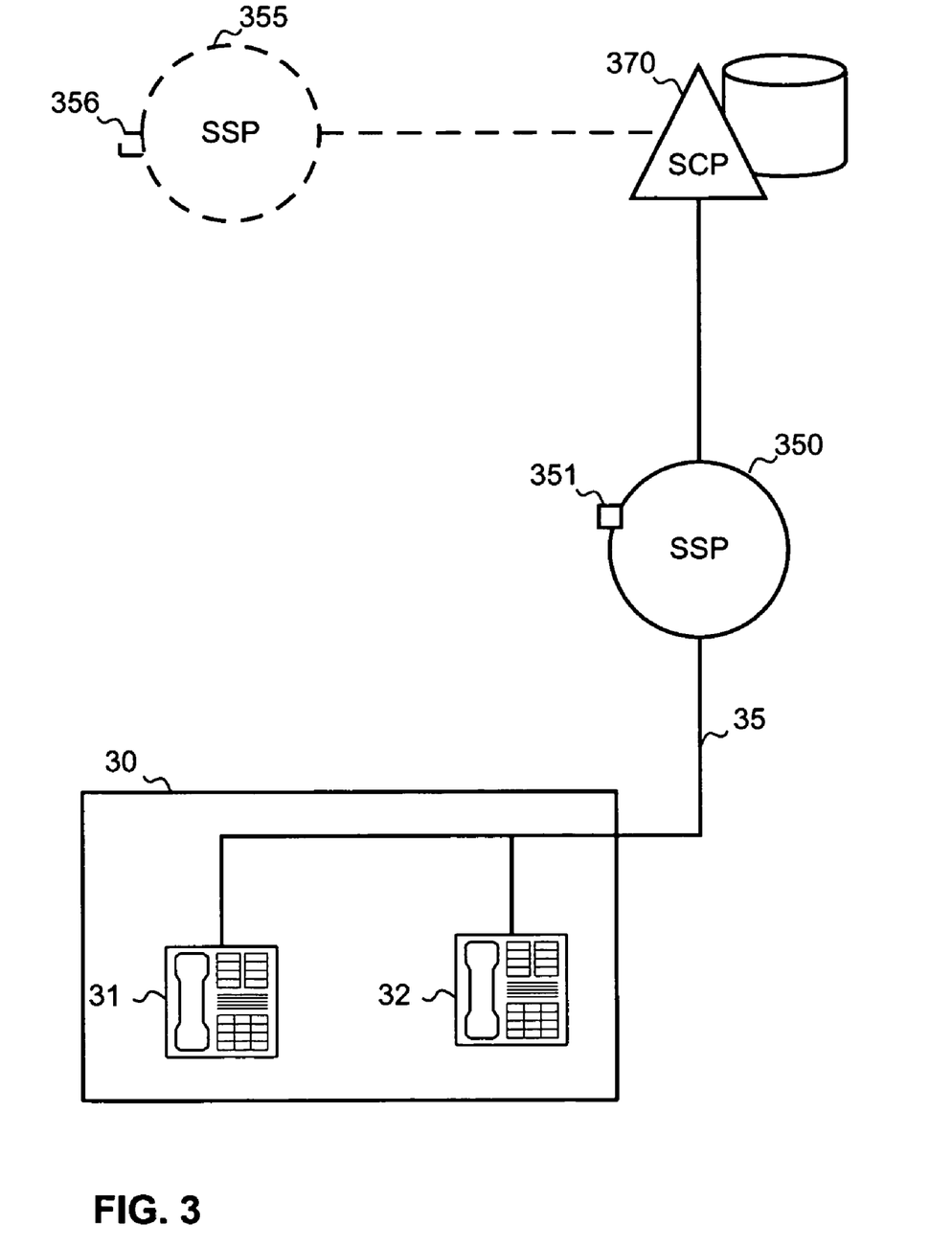
FIG. 3 illustrates another system for providing an intercom service using the telephones at a location.

FIG. 3 illustrates another system for providing an intercom service using the telephones at a location. Telephones 31 and 32 of location 30 are coupled to SSP 350 via landline 35 (e.g., a landline to a central office). A first user at telephone 31 can take telephone 31 off-hook and enter a public feature code (e.g., a star code such as *NN) Advanced Intelligent Network ("AIN") trigger. SSP 350 will recognize the public feature code and send an AIN query to service control point ("SCP") 370. In another embodiment, another AIN trigger can be used as part of an intercom service system, e.g., a 3/6/10 digit public office dialing plan ("PODP") AIN trigger, an N11 AIN trigger, or other AIN trigger (e.g., an off-hook delay trigger as described hereinafter).

SCP 370 will receive the AIN query and can extract the calling number to determine whether the calling number is a subscriber to an intercom service, whether the calling number should be charged for the intercom service call, or whether the intercom service request is to be rejected (e.g., the calling number is not subscribed to an intercom service plan). When an intercom service call is to be made to telephones 31 and 32, the SCP 370 can check the status of landline 35. In an embodiment, SCP 370 can wait a predetermined period of time (e.g., five seconds, ten seconds, etc.) after receiving the AIN query before checking the status of landline 35. When landline 35 is busy, the SCP 370 terminates the attempt to establish an intercom call.

When landline 35 is available to receive a call, the SCP 370 directs initiating a first leg of an intercom call to telephones 31 and 32 (e.g., to the calling number, to a number associated with location 30 having a distinctive ring, and so on). The second leg of the intercom call can be made to a telephone number that will answer and remain silent—e.g., a dummy intercom telephone number ("DITN"), a system intercom telephone number, a switch intercom telephone number—during the intercom service call. In an embodiment, SSP 350 includes a DITN 351 for intercom service calls to location 30. In another embodiment, another SSP 355 (e.g., an SSP that did not generate the AIN query regarding the intercom service request call from location 30) can include one or more DITNs 356 that can receive the second leg of the intercom call to location 30. SSP 355 can be an SSP within the same local access and transport area ("LATA") as location 30 and SSP 350.

Figure 4:
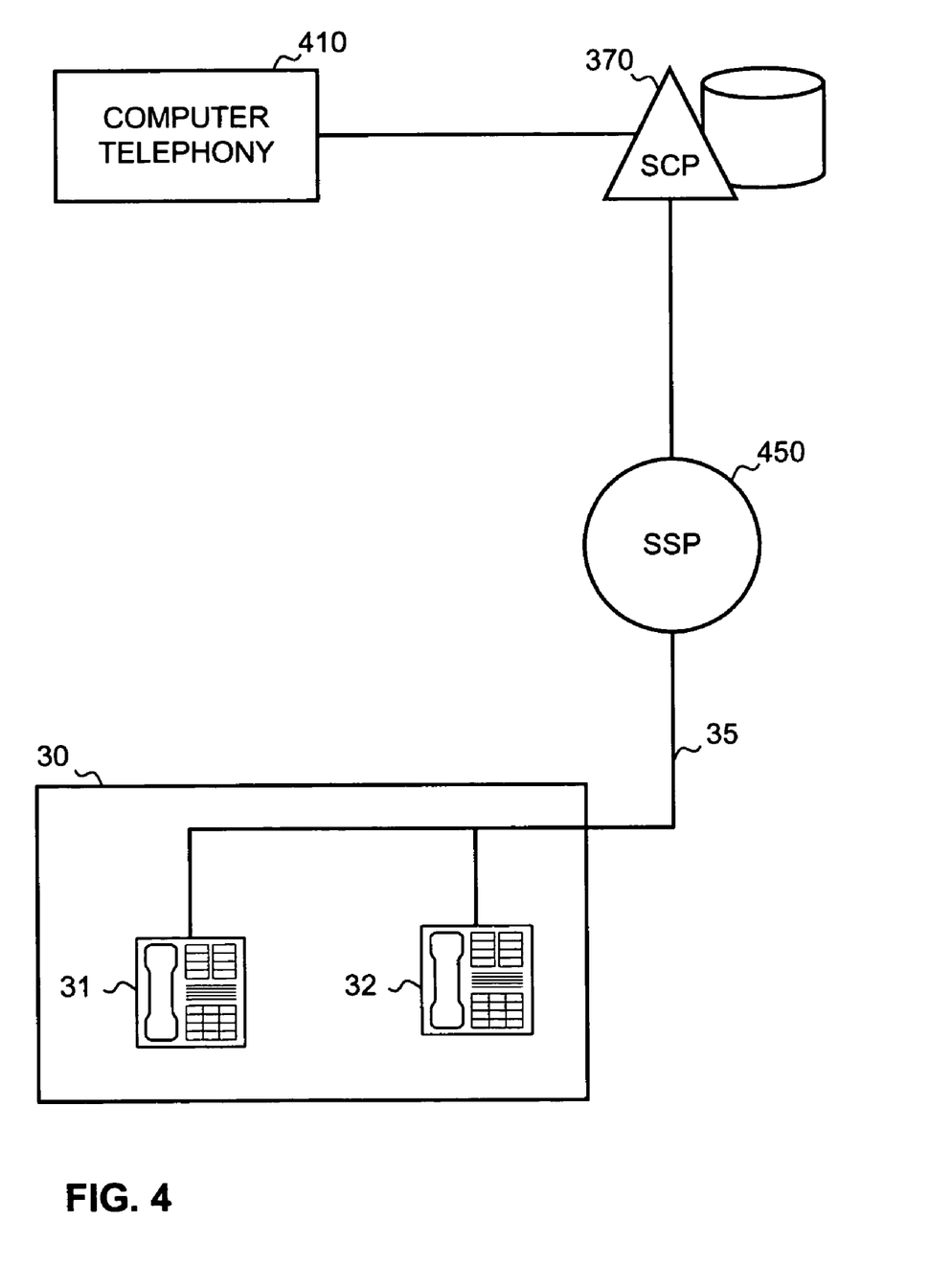
FIG. 4 shows another embodiment of the present invention.

FIG. 4 shows another embodiment of the present invention. SCP 370 receives an AIN query from SSP 450 indicating that location 30 has requested an intercom service call. When landline 35 is available to receive the intercom call, SCP 370 directs initiating a first leg of an intercom call to telephones 31 and 32 and directs initiating the second leg of the call to computer telephony device 410. When the call is answered at location 30, computer telephony device 410 can announce that the call is an intercom service call. Computer telephony device 410 can remain on the call until there is a termination event such as telephones 31 and 32 hanging up (e.g., landline 35 being idle), expiration of a timer, and so on.

Figure 5:
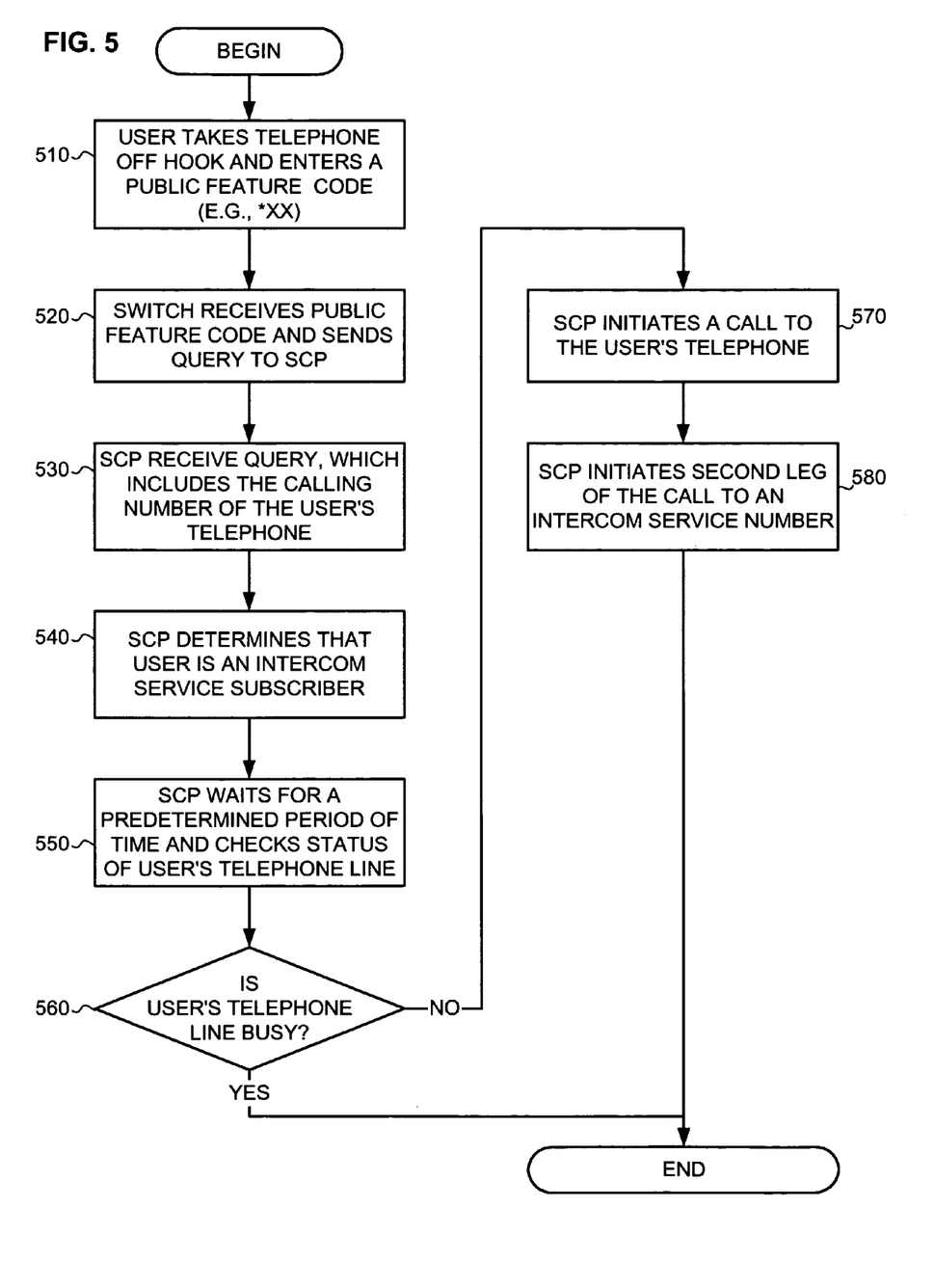
FIG. 5 shows a method in accordance with an embodiment of the present invention.

FIG. 5 shows a method in accordance with an embodiment of the present invention. A user takes a telephone off-hook and enters a public feature code (e.g., *XX) (step 510). A switch (e.g., an SSP) receives the public feature code and sends a query to an SCP (step 520). The SCP receives the query, which includes the calling number of the user's telephone (step 530), and determines that the user is an intercom service subscriber (step 540). The SCP waits a predetermined period of time and checks the status of the user's telephone line (step 550). Whether the user's telephone line is busy is determined (step 560). If the user's telephone line is busy, the intercom service request is ended. If the user's telephones line is available, the SCP initiates a call to the user's telephone (step 570) and initiates a second leg of the call to an intercom service number (e.g., a dummy number of an SSP) (step 580).

Figure 6:
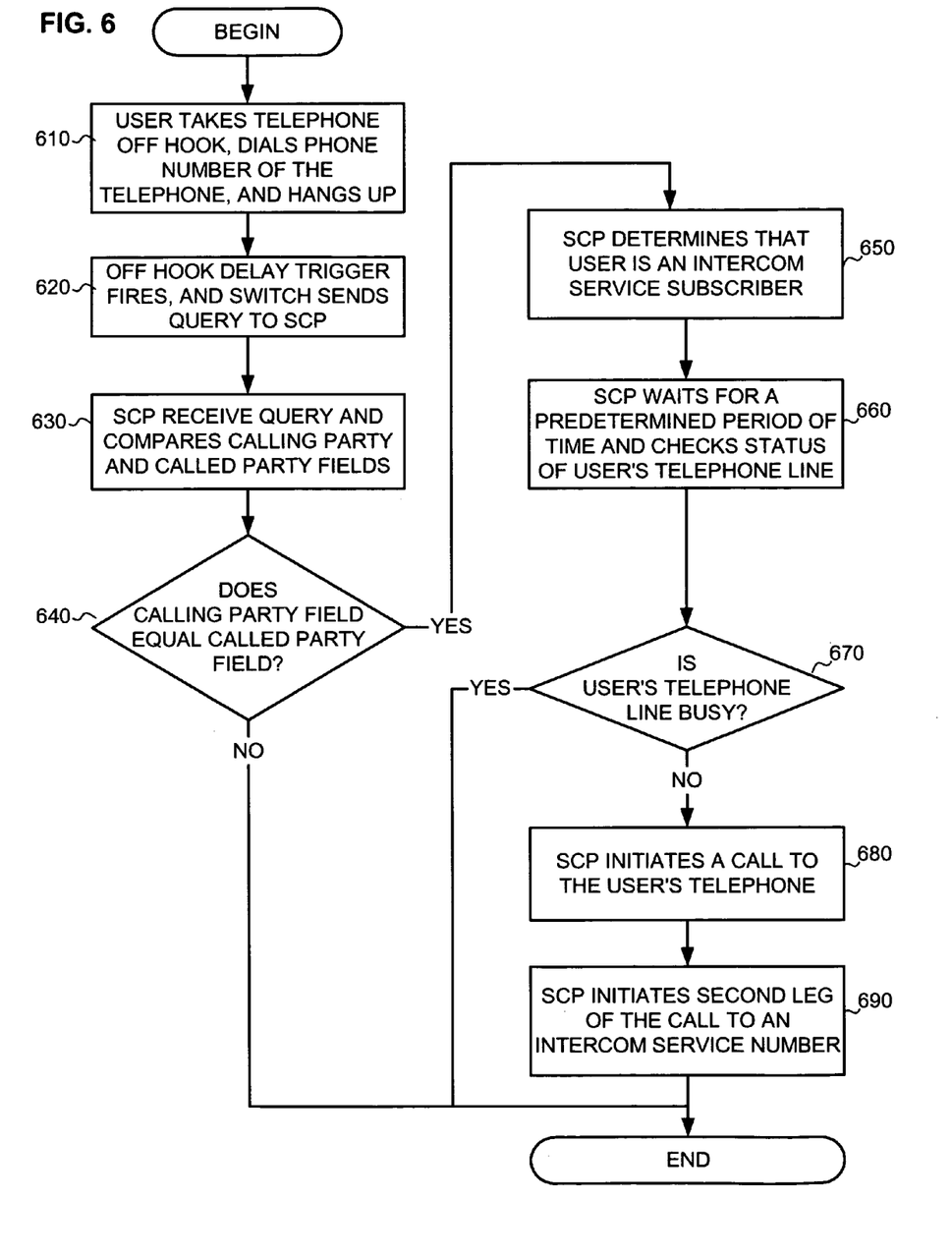
FIG. 6 shows another method in accordance with an embodiment of the present invention.

FIG. 6 shows another method in accordance with an embodiment of the present invention. A user takes a telephone off-hook, dials the phone number corresponding to the same line where she is calling from of the telephone, and hangs up (step 610). For example, if the user has a single telephone line and her phone number is (404) 555-1212, she dials (404) 555-1212. An off-hook delay trigger fires, and a switch sends a query to an SCP (step 620). The SCP receives the query and compares the calling party field to the called party field (step 630). Whether the calling party field equals the called party field is determined (step 640). If the calling party field does not equal the called party field, an intercom service call is not made and the SCP can respond to the switch to proceed with normal call processing. If the calling party field equals the called party field, the SCP can determine that the user is an intercom service subscriber (e.g., via a database look-up) (step 650). In an embodiment, the SCP can also determine whether the intercom service call is to be made to a second number associated with the user and/or the calling number that has a distinctive ring. The SCP can wait for a predetermined period of time and check the status of the user's telephone line (step 660). Whether the user's telephone line is busy is determined (step 670). If the user's telephone line is busy, the intercom service request is ended. In an embodiment, the intercom service request ends when the user's telephone line is busy because some voice-mail service subscribers call themselves to reach their own voice-mail and leave a reminder message. If the user's telephones line is available, the SCP initiates a call to the user's telephone (step 680) and initiates a second leg of the call to an intercom service number (e.g., a dummy number of an SSP) (step 690). In another embodiment, the SCP initiates the second leg of the call to a computer telephony device (e.g., that can play an announcement regarding the intercom call).

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously provide an intercom service for telephones at a residence. Specialized intercom equipment need not be purchased and installed to provide intercom services. Intercom services can be provided even though a residence has only one active telephone line. Embodiments of the present invention can provide an intercom service using a service node. In other embodiments of the present invention, intercom service calls are set up using AIN services.

Embodiments of systems and methods for using telephones associated with a telephone number as an intercom system have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A method for providing an intercom service to a plurality of telephones associated with a calling number at a location, the method comprising:

receiving at a remote network an intercom service request from a first telephone at the location, the intercom service request including the calling number associated with the location;

determining that the calling number corresponds to a subscriber to the intercom service;

receiving an on-hook signal at the remote network from the first telephone at the calling location; and directing initiation of an intercom call from the remote network to the location upon receiving the on-hook signal.

2. The method of claim 1, further comprising:

receiving an indication that the intercom call to the location has been answered;

and terminating the intercom call based at least in part on a termination condition.

3. The method of claim 2, wherein the termination condition is selected from the group of an expiration of a predetermined time period, a determination that a telephone line is idle, a determination that a telephone at the location has gone on-hook, and an expiration of an extended time period.

4. The method of claim 1, wherein receiving the intercom service request includes receiving an intercom service request call, the intercom service request call including the calling number associated with the location.

5. The method of claim 4, wherein receiving the intercom service request call includes receiving the intercom service request call at a service node.

6. The method of claim 5, further comprising:

receiving an indication that the intercom call to the location has been answered;

maintaining the intercom call; and terminating the intercom call based at least in part on a termination condition.

7. The method of claim 6, wherein receiving an indication that the intercom call has been answered includes playing an announcement indicating the nature of the intercom call.

8. The method of claim 1, wherein receiving the intercom service request includes receiving an intercom service request query, the intercom service request query including the calling number associated with the location.

9. The method of claim 8, wherein receiving the intercom service request query includes receiving the intercom service request query at a service control point.

10. The method of claim 8, wherein the intercom service request query is an advanced intelligent network ("AIN") query.

11. The method of claim 10, wherein the intercom service request query is generated based at least in part on a received public feature code.

12. The method of claim 10, wherein the intercom service request query is generated based at least in part on an off-hook delay trigger.

13. The method of claim 12, further comprising comparing a calling number field of the intercom service request query to a called number field of the service request query.

14. The method of claim 1, further comprising determining a subscriber intercom telephone number of the location based at least in part on the calling number, the subscriber intercom telephone number being different from the calling number, the calling number being associated with a first call ringing pattern, the subscriber intercom telephone number being associated with a second call ringing pattern, the first call ringing pattern being different from the second call ringing pattern.

15. The method of claim 14, wherein directing initiation of the intercom call to the location includes directing initiation of the intercom call to the subscriber intercom telephone number.

16. A system for providing an intercom service to a plurality of telephones associated with a calling telephone number at a location, the system comprising:
  an intercom service subscriber database, the intercom service subscriber database including a plurality of intercom service subscriber data records, each intercom service subscriber data record of at least a subset of the plurality of intercom service subscriber data records including a calling telephone number field to store a calling telephone number;
  a service switching point, the service switching point coupled to the intercom service subscriber database; and
  a communications link coupled to the service switching point, the communications link associated at least in part with the calling telephone number;
  means for receiving an on-hook signal at a remote network from a first telephone of the plurality corresponding to the calling telephone number at the location; and
  means for directing an initiation of an intercom call from the remote network to the plurality of telephones associated with the calling telephone number at the location associated with the calling telephone number, after receiving the on-hook signal from the first telephone.

17. The system of claim 16, wherein each intercom service subscriber data record of at least the subset of the plurality of intercom service subscriber data records includes a subscriber intercom service telephone number field to store a subscriber intercom service telephone number, the subscriber intercom service telephone number being different from the calling telephone number.

18. The system of claim 17, wherein the calling telephone number is associated with a first call ringing pattern, the subscriber intercom service telephone number is associated with a second call ringing pattern, the first call ringing pattern being different from the second call ringing pattern.

19. The system of claim 16, further comprising a service node, the service node coupled to the intercom service subscriber database.

20. The system of claim 19, wherein the service node is to answer an intercom service request call received via the communications link the intercom service request call including a calling telephone number.

21. The system of claim 20, wherein the service node is to play an intercom service announcement based at least in part on answering the intercom service request call.

22. The system of claim 20, wherein the service node is to initiate an intercom service call based at least in part on the intercom service request call.

23. The system of claim 22, wherein the service node is to terminate the intercom service call based at least in part on a termination condition.

24. The system of claim 16, further comprising a service control point, the service control point coupled to the intercom service subscriber database.

25. The system of claim 24, wherein the service control point is to receive an intercom service request query generated by the service switching point, the intercom service request query including a calling telephone number.

26. The system of claim 25, wherein the service control point is to initiate a first leg of an intercom service call based at least in part on the intercom service request query, the first leg of the intercom service call to be carried at least in part by the communications link.

27. The system of claim 26, wherein the service control point is to initiate a second leg of the intercom service call to a system intercom service telephone number.

28. The system of claim 26, wherein the service control point is to initiate a second leg of the intercom service call to a computer telephony device.

29. A method for using two or more telephones associated with a calling telephone number at a location as an intercom service, the method comprising:
  receiving a first off-hook indication at a remote network from a first telephone at the location;
  receiving a dialed key sequence from the first telephone;
  receiving an intercom service request, the intercom service request based at least in part on the dialed key sequence, the intercom service request including the calling telephone number, the calling telephone number associated with the location;
  receiving an on-hook indication at the remote network from the first telephone;
  directing initiation of an intercom call from the remote network to the location based at least in part on the intercom service request upon receiving the on-hook indication from the first telephone;
  receiving a second off-hook indication at the remote network;
  determining a terminating condition for the intercom call; and
  terminating the intercom call based at least in part on the terminating condition.

30. The method of claim 29, wherein receiving an intercom service request includes receiving an intercom service request call.

31. The method of claim 29, wherein receiving an intercom service request includes receiving an intercom service request query.

32. The method of claim 29, wherein the dialed key sequence is selected from the group consisting of a dialed telephone number different from the calling telephone number, a public feature code, and the calling telephone number.

33. The method of claim 29, wherein directing initiation of an intercom call to the location based at least in part on the intercom service request includes directing initiation of an intercom call to a subscriber intercom telephone number, the subscriber intercom telephone number being different than the calling telephone number.

34. The method of claim 33, wherein the calling telephone number is associated with a first call ringing pattern, the subscriber intercom telephone number is associated with a second call ringing pattern, the first call ringing pattern being different from the second call ringing pattern.

35. A method for using the two or more telephones associated with a calling telephone number at a location as an intercom service, the method comprising:
  sending a first off-hook indication to a remote network from a first telephone at the location;
  receiving a dial-tone signal;
  sending a sequence of dialed key signals, the sequence of dialed key signals corresponding to an intercom service;
  sending a first on-hook indication to the remote network from the first telephone at the location;
  receiving an intercom call ringing sequence of an intercom call after the first on-hook indication has been sent;

sending communication signals to a second telephone at the location during the intercom call; and receiving communication signals from the second telephone at the location during the intercom call.

36. The method of claim 35, wherein the intercom call ringing sequence of the intercom call is a standard call ringing sequence.

37. The method of claim 36, wherein the standard call ringing sequence includes a sequence of approximately six seconds in duration having approximately two seconds of ringing and approximately four seconds of silence.

38. The method of claim 35, wherein the intercom call ringing sequence of the intercom call is a distinctive call ringing sequence, the distinctive call ringing sequence being different from a standard call ringing sequence.

39. The method of claim 35, further comprising:
sending a second off-hook indication: and
receiving the intercom call based at least in part on sending the second off-hook indication.

40. The method of claim 39, wherein:
sending a second off-hook indication includes sending a second off-hook indication from the second telephone; and
receiving the intercom call based at least in part on sending the second off-hook indication includes receiving the intercom call at the second telephone.

41. The method of claim 39, wherein:
sending a second off-hook indication includes sending a second off-hook indication from the first telephone; and
receiving the intercom call based at least in part on sending the second off-hook indication includes receiving the intercom call at the first telephone.

42. A system for providing an intercom service to a plurality of telephones associated with a calling telephone number at a location, the system comprising:
means for receiving an intercom service request at a remote network from a first telephone at the location, the intercom service request including a the calling telephone number associated with the location;
means for determining that the calling telephone number corresponds to a subscriber to the intercom service;
means for receiving an on-hook signal from at the remote network from the first telephone at the location; and
means for directing initiation of an intercom call from the remote network to the location upon receiving the on-hook signal.

43. The system of claim 42, further comprising:
means for receiving an indication that the intercom call to the location has been answered; and
means for terminating the intercom call based at least in part on a termination condition.

44. The system of claim 42, wherein:
the means for receiving an intercom service request includes a service node; and
the intercom service request includes an intercom service request call.

45. The system of claim 42, wherein:
the means for receiving an intercom service request includes a service control point; and
the intercom service request includes an intercom service request query.

46. A method for providing an intercom service to a plurality of telephones associated with a calling telephone number at a location, the method comprising:
a step for receiving an intercom service request at a remote network from a first telephone of the location, the intercom service request including a the calling telephone number associated with the location;
a step for determining that the calling telephone number corresponds to a subscriber to the intercom service;
a step for determining at the remote network an on-hook status of the first telephone at the location; and
a step for directing initiation of an intercom call from the remote network to the location upon determining the on-hook status.

47. The method of claim 46, further comprising:
a step for receiving an indication that the intercom call to the location has been answered; and
a step for terminating the intercom call based at least in part on a termination condition.

48. The method of claim 47, wherein the termination condition is selected from the group of an expiration of a predetermined time period, an indication that a telephone line is idle, an indication that a telephone at the location has gone on-hook, and an expiration of an extended time period.

49. The method of claim 46, wherein the step for receiving the intercom service request includes a step for receiving an intercom service request call, the intercom service request call including the calling telephone number associated with the location.

50. The method of claim 49, wherein the step for receiving the intercom service request call includes a step for receiving the intercom service request call at a service node.

51. The method of claim 46, wherein the step for receiving the intercom service request includes a step for receiving an intercom service request query, the intercom service request query including the calling telephone number associated with the location.

52. A computer-readable medium storing a plurality of instructions to be executed by a processor for providing an intercom service to a plurality of telephones associated with a calling telephone number at a location, the plurality of instructions comprising instructions to:
receive an intercom service request at a remote network from a first telephone at the location, the intercom service request including the calling telephone number associated with the location;
determine that the calling telephone number corresponds to a subscriber to the intercom service;
determine at the remote network an on-hook status of the first telephone at said location associated with said calling telephone number; and
direct initiation of an intercom call from the remote network to the location upon determining the on-hook status.

53. The computer-readable medium of claim 52, further comprising instructions to:
receive an indication that the intercom call to the location has been answered; and
terminate the intercom call based at least in part on a termination condition.

54. The computer-readable medium of claim 52, wherein the instructions to receive the intercom service request include instructions to receive an intercom service request call, the intercom service request call including the calling telephone number associated with the location.

55. The computer-readable medium of claim 54, wherein the instructions to receive the intercom service request call include instructions to receive the intercom service request call at a service node.

56. The computer-readable medium of claim 55, further comprising instructions to:

receive an indication that the intercom call to the location has been answered;

maintain the intercom call; and terminate the intercom call based at least in part on a termination condition.

57. The computer-readable medium of claim 56, wherein the instructions to receive an indication that the intercom call has been answered include instructions to play an announcement indicating the nature of the intercom call.

58. The computer-readable medium of claim 52, wherein the instructions to receive the intercom service request include instructions to receive an intercom service request query, the intercom service request query including the calling telephone number associated with the location.

59. The computer-readable medium of claim 58, wherein the instructions to receive the intercom service request query include instructions to receive the intercom service request query at a service control point.

60. The computer-readable medium of claim 58, wherein the intercom service request query is an advanced intelligent network ("AIN") query.

61. The computer-readable medium of claim 60, wherein the intercom service request query is generated based at least in part on a received public feature code.

62. The computer-readable medium of claim 60, wherein the intercom service request query is generated based at least in part on an off-hook delay trigger.

63. The computer-readable medium of claim 62, further comprising instructions to compare a calling telephone number field of the intercom service request query to a called number field of the service request query.

64. The computer-readable medium of claim 52, further comprising instructions to determine a subscriber intercom telephone number of the location based at least in part on the calling telephone number, the subscriber intercom telephone number being different from the calling telephone number, the calling telephone number being associated with a first call ringing pattern, the subscriber intercom telephone number being associated with a second call ringing pattern, the first call ringing pattern being different from the second call ringing pattern.

65. The computer-readable medium of claim 64, wherein the instructions to direct initiation of the intercom call to the location include instructions to direct initiation of the intercom call to the subscriber intercom telephone number.

\* \* \* \* \*